(12) United States Patent
Nabeshima et al.

(10) Patent No.: US 10,850,435 B2
(45) Date of Patent: Dec. 1, 2020

(54) FOAM MOLDED ARTICLE MOLD AND FOAM MOLDED ARTICLE

(71) Applicant: TOYOTA BOSHOKU KABUSHIKI KAISHA, Kariya (JP)

(72) Inventors: Yoichi Nabeshima, Tokyo (JP); Shin Tada, Tokyo (JP); Masatoshi Satou, Tokyo (JP); Hirokazu Hirano, Kariya (JP)

(73) Assignee: Toyota Boshoku Kabushiki Kaisha, Kariya (JP)

( * ) Notice: Subject to any disclaimer, the term of this patent is extended or adjusted under 35 U.S.C. 154(b) by 29 days.

(21) Appl. No.: 15/322,421

(22) PCT Filed: Jun. 25, 2015

(86) PCT No.: PCT/JP2015/068417
§ 371 (c)(1),
(2) Date: Dec. 27, 2016

(87) PCT Pub. No.: WO2016/002636
PCT Pub. Date: Jan. 7, 2016

(65) Prior Publication Data
US 2017/0151695 A1    Jun. 1, 2017

(30) Foreign Application Priority Data
Jul. 3, 2014   (JP) ................... 2014-138050

(51) Int. Cl.
*B29C 44/58*    (2006.01)
*B29C 39/26*    (2006.01)
(Continued)

(52) U.S. Cl.
CPC ............ *B29C 44/588* (2013.01); *B29C 33/10* (2013.01); *B29C 33/42* (2013.01); *B29C 39/26* (2013.01);
(Continued)

(58) Field of Classification Search
CPC ....... B29C 44/588; B29C 33/10; B29C 33/42; B29C 39/26; B29K 2075/00;
(Continued)

(56) References Cited

U.S. PATENT DOCUMENTS

| | | | | |
|---|---|---|---|---|
| 4,088,722 A | * | 5/1978 | Marjoram | B29C 33/00 264/331.19 |
| 6,352,659 B1 | * | 3/2002 | Clark | B29C 33/10 249/134 |
| 2006/0135050 A1 | * | 6/2006 | Petersen | B24D 11/005 451/523 |

FOREIGN PATENT DOCUMENTS

JP    58-203027 A    11/1983
JP    2-292007 A    12/1990
(Continued)

*Primary Examiner* — Michael Zhang
(74) *Attorney, Agent, or Firm* — Quarles & Brady LLP

(57) ABSTRACT

A foam molded article mold includes a lower mold with a cavity space; an upper mold formed with an upper mold face portion facing a lower mold face portion of the cavity space when the upper mold has been brought together with the lower mold; a partitioning wall that projects out from the upper mold face portion, and that configures a first parting line between the partitioning wall and the lower mold face portion in a state in which the upper mold has been brought together with the lower mold; and a partition that projects out from the lower mold face portion, and that, in a state in which the upper mold has been brought together with the lower mold, partitions the cavity space together with the partitioning wall to form plural cavities, and that configures a second parting line between the partition and the partitioning wall.

1 Claim, 9 Drawing Sheets

(51) Int. Cl.
*B29C 33/42* (2006.01)
*B29C 33/10* (2006.01)
*B29K 105/00* (2006.01)
*B29K 75/00* (2006.01)
*B29K 105/04* (2006.01)

(52) U.S. Cl.
CPC .. *B29K 2075/00* (2013.01); *B29K 2105/0014* (2013.01); *B29K 2105/0058* (2013.01); *B29K 2105/04* (2013.01)

(58) Field of Classification Search
CPC .... B29K 2105/0014; B29K 2105/0058; B29K 2105/04
See application file for complete search history.

(56) References Cited

FOREIGN PATENT DOCUMENTS

| | | |
|---|---|---|
| JP | 4-371812 A | 12/1992 |
| JP | 3008934 B2 | 2/2000 |
| JP | 2004-262131 A | 9/2004 |
| JP | 2008-168446 A | 7/2008 |
| JP | 2010-201726 A | 9/2010 |

\* cited by examiner

FOAM MOLDED ARTICLE MOLD AND FOAM MOLDED ARTICLE

CROSS REFERENCE TO RELATED APPLICATIONS

The present application is the U.S. national phase of PCT Application No. PCT/JP2015/068417 filed on Jun. 25, 2015, which claims the priority of a Japanese patent application No. 2014-138050 filed in Japan on Jul. 3, 2014, both disclosures of which are incorporated in their entirety by reference herein.

TECHNICAL FIELD

The present disclosure relates to a foam molded article mold and a foam molded article.

BACKGROUND ART

Japanese Patent No. 3008934 (FIG. 2 in particular) describes an invention relating to a foam molded article mold. In this foam molded article mold, a cavity is provided at a lower mold, and a partitioning wall is provided at an upper mold. When the upper mold covers the lower mold, the cavity of the lower mold is partitioned into plural cavities by the partitioning wall of the upper mold. Accordingly, injecting a foaming liquid resin stock into the cavity of the lower mold and covering the lower mold with the upper mold enables the foaming liquid resin stock to foam and harden inside the respective divided cavities. This enables plural foam molded articles to be formed by a single round of injection of foaming liquid resin stock.

SUMMARY OF INVENTION

Technical Problem

However, in the foam molded article mold described in Japanese Patent No. 3008934, a parting line between the partitioning wall of the upper wall and a bottom face (molding face) of the lower mold is set along the bottom face of the lower mold. Gas generated when the foaming liquid resin stock is foamed thus has nowhere to escape, with underfill conceivably arising in the foam molded article.

In consideration of the above circumstances, the present disclosure obtains a foam molded article mold that is capable of suppressing the occurrence of underfilling while securing productivity, and a foam molded article in which underfilling has been reduced.

Solution to Problem

A foam molded article mold of a first aspect of the present disclosure includes: a lower mold that is provided with a cavity space; an upper mold that is configured to be brought together with the lower mold, and that is formed with an upper mold face portion facing a lower mold face portion of the cavity space in a state in which the upper mold has been brought together with the lower mold; a partitioning wall that projects out from the upper mold face portion, and that configures a first parting line between the partitioning wall and the lower mold face portion in a state in which the upper mold has been brought together with the lower mold; and a partition that projects out from the lower mold face portion, and that, in a state in which the upper mold has been brought together with the lower mold, partitions the cavity space together with the partitioning wall so as to form plural cavities, that configures a second parting line between the partition and the partitioning wall so as to place the first parting line and the outside of the cavities in communication with each other.

A foam molded article of a second aspect of the present disclosure includes: a main body that is formed from foamed resin and that includes an upper face, a lower face, and an outer peripheral face connecting the upper face and the lower face together; and a parting line portion that is provided at the outer peripheral face, and that is formed from one end side of the main body at the lower face, to another end side of the main body on the opposite side to the one end side at the upper face, without transiting the other end side of the lower face.

Advantageous Effects of Invention

The present disclosure enables a foam molded article mold that is capable of suppressing underfilling from occurring while securing productivity to be obtained, and a foam molded in which underfilling has been reduced to be obtained.

DESCRIPTION OF EMBODIMENTS

First Exemplary Embodiment

Figure 1:
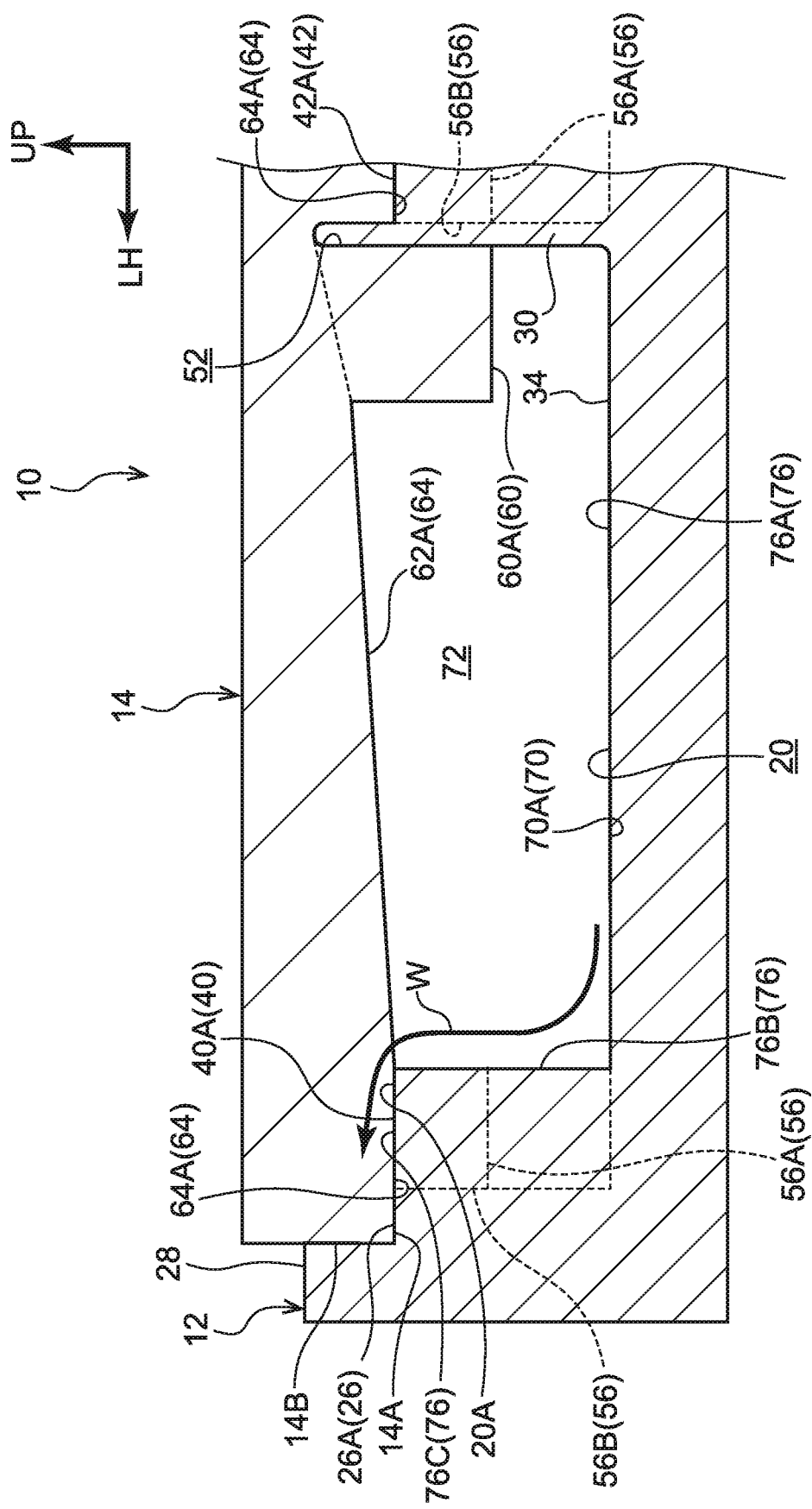
FIG. 1 is an enlarged cross-section (a cross-section illustrating a state sectioned along line 1-1 in FIG. 5) of a foam molded article mold according to a first exemplary embodiment.

Explanation follows regarding an example of a first exemplary embodiment of a foam molded article mold (referred to below simply as "mold") 10 according to the present disclosure, with reference to FIG. 1 to FIG. 5. Note that in the drawings, the arrow FR indicates the front of the mold, the arrow UP indicates the mold upper side, and the arrow LH indicates the left of the mold, as appropriate.

Figure 5:
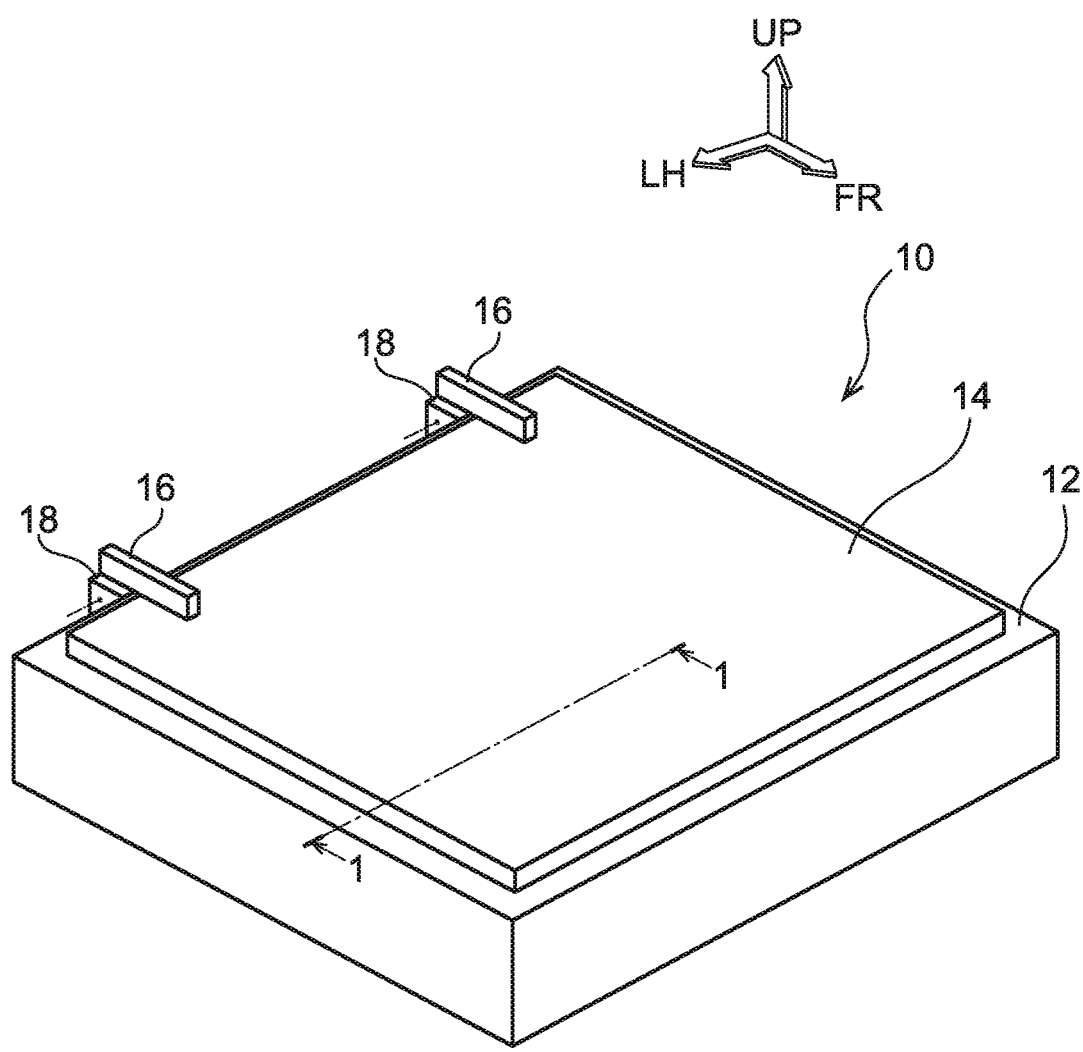
FIG. 5 is a perspective view illustrating a foam molded article mold according to the first exemplary embodiment.

As illustrated in FIG. 5, the mold 10 is configured including a lower mold 12 that is formed with a rectangular shape (square shape) in plan view, and an upper mold 14 that is formed with a rectangular shape (square shape) slightly smaller than the lower mold in plan view and that is brought together with the lower mold 12. More specifically, hinge arms 16 configured respectively by L-shaped plate members in side view are provided at the upper mold 14. The hinge arms 16 are axially supported by respective hinge bearing portions 18 provided at the lower mold 12. The upper mold 14 is thereby supported by the lower mold 12 so as to be capable of swinging therefrom.

Figure 4:
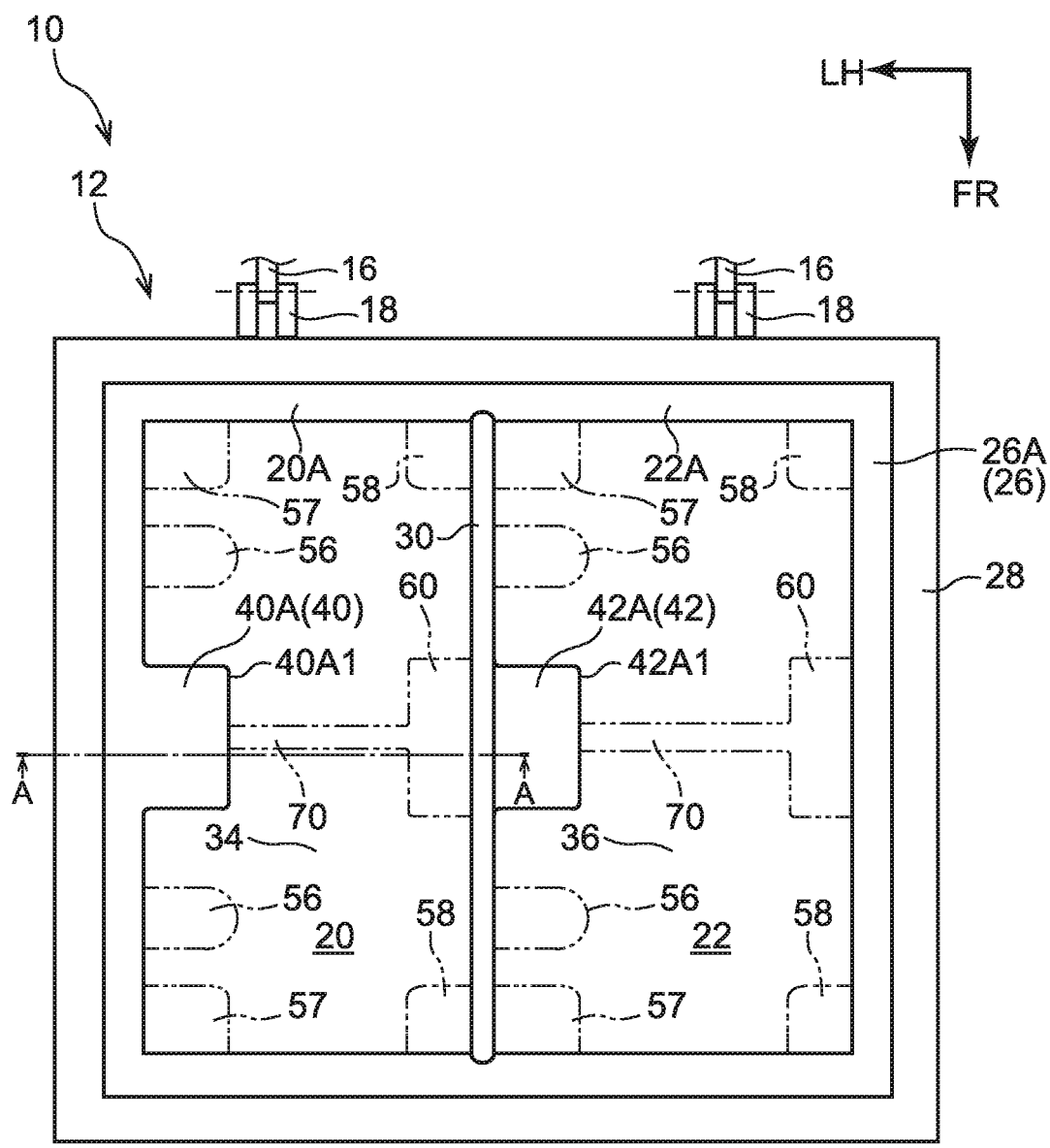
FIG. 4 is a plan view illustrating a lower mold of a foam molded article mold according to the first exemplary embodiment, as viewed from a mold face side.

As illustrated in FIG. 4, the lower mold 12 is configured including plural lower cavity spaces 20, 22, peripheral walls 26 that configure peripheral walls of the lower cavity spaces 20, 22, and an outer frame 28 that stands upright so as to enclose the peripheral walls 26. Note that the upper mold 14 is set to a size so as to be contained within the inner periphery of the outer frame 28.

The lower cavity spaces 20, 22 are formed with rectangular shapes (oblong shapes) in plan view, and are formed side by side to each other, in this sequence, from a mold width direction left side. The lower cavity spaces 20, 22 are partitioned by a lower partitioning wall 30. Bottom faces of the lower cavity spaces 20, 22 are respectively configured by lower mold face portions 34, 36 and are formed, for example, with flat plane shapes. Note that the lower mold face portions 34, 36 may be formed with curved face shapes, or may be formed with inclined face shapes.

Moreover, cuboidal shaped partitions 40, 42 are provided inside the respective lower cavity spaces 20, 22 projecting out from the lower mold face portions 34, 36 toward the mold upper side. More specifically, the partition 40, which is provided inside the lower cavity space 20, is integrally formed at the peripheral wall 26 at a mold front-rear direction central portion of a section of the peripheral walls 26 configuring the mold width direction outside of the lower cavity space 20.

On the other hand, the partition 42, which is provided inside the lower cavity space 22, is integrally formed at the lower partitioning wall 30 partitioning the lower cavity space 20 and the lower cavity space 22 from each other: at a mold front-rear direction central portion of the lower partitioning wall 30.

Upper faces (upper ends) 40A, 42A of the partitions 40, 42 and upper face 26A of the peripheral walls 26 are set so as to be disposed in the same plane as each other. Peripheral edges 40A1, 42A1 of the upper faces 40A, 42A configure portions of upper peripheral edges 20A, 22A of the lower cavity spaces 20, 22. In other words, the upper face 40A is formed continuous with the upper peripheral edge 20A, and the upper face 42A is formed continuous with the upper peripheral edge 22A.

In the lower mold 12 configured in this manner, the respective lower cavity spaces 20, 22 are set with the same shape. More specifically, the lower cavity spaces 20, 22 are each configured with a shape in which a mold front-rear direction central portion has been recessed in a rectangular shape in plan view.

Figure 3:
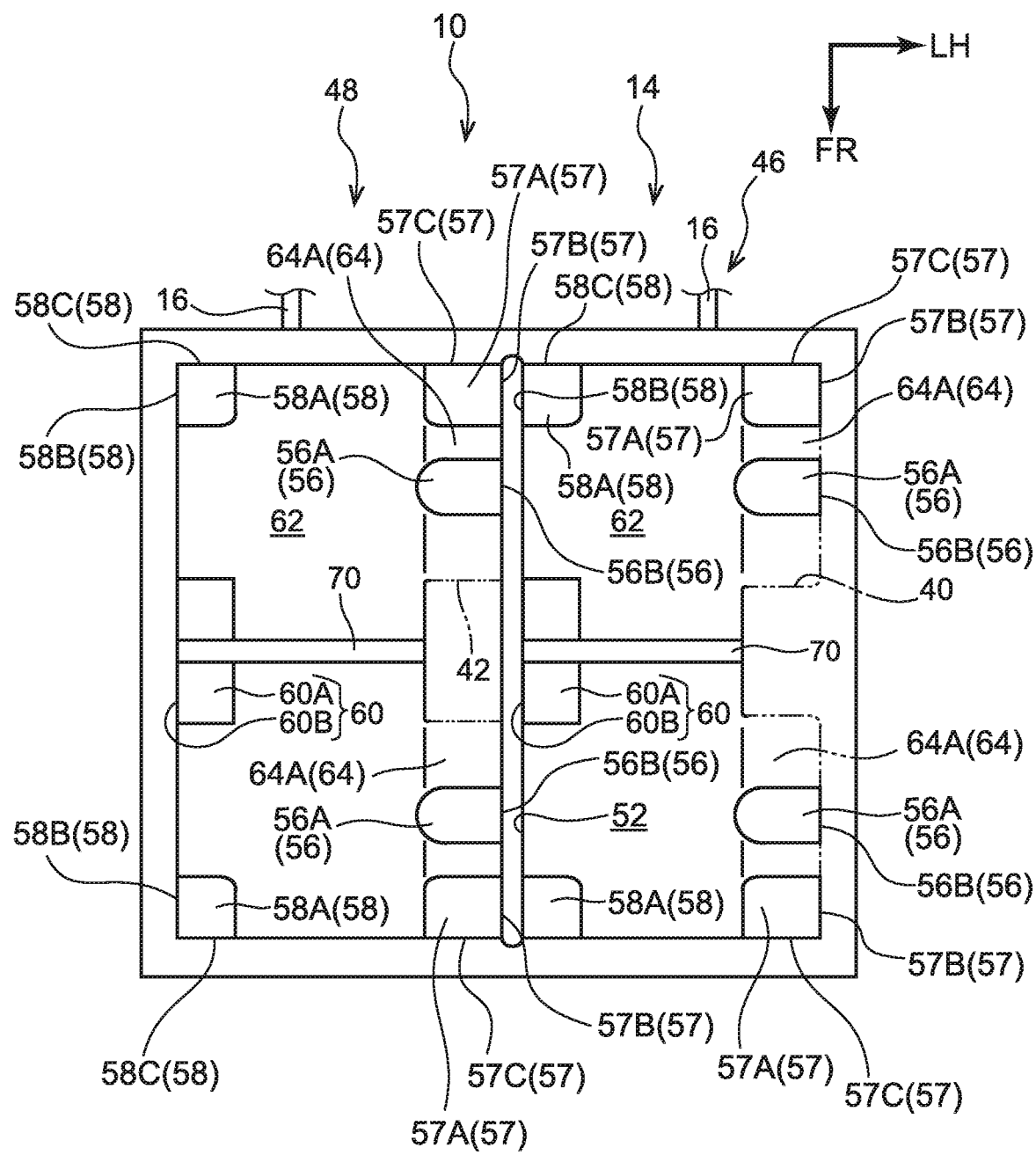
FIG. 3 is a plan view illustrating an upper mold of a foam molded article mold according to the first exemplary embodiment, as viewed from a mold face side.

As illustrated in FIG. 3, upper mold sections 46, 48 corresponding to the lower cavity spaces 20, 22 described above are formed at the upper mold 14. In the present exemplary embodiment, for example, the upper mold section 46 and the upper mold section 48 are disposed side by side in the mold width direction and are partitioned by an insertion portion 52 into which the lower partitioning wall 30 is inserted in a state in which the upper mold 14 has been brought together with the lower mold 12. Note that the upper molding sections 46, 48 may be disposed side by side in the mold front-rear direction. In such cases, the lower partitioning wall 30 would be configured extending along the mold width direction, and the insertion portion 52 would be formed so as to correspond with the lower partitioning wall 30 as well. Moreover, the lower partitioning wall 30 may be configured so as to be disposed along a diagonal between corners of the lower mold 12, in other words, configured so as to extend obliquely in front face view.

The upper mold section 46 and the upper mold section 48 are configured with basically the same configuration as each other, and so explanation of configuration thereof is given using the upper mold section 46 corresponding with the lower cavity space 20 as an example. Note that in FIG. 3, in a state in which the upper mold 14 has been brought together with the lower mold 12, outlines of the lower cavity spaces 20, 22 are illustrated by double-dotted dashed lines in order to facilitate understanding of the correspondence relationship between the upper molding sections 46, 48 and the lower cavity spaces 20, 22. Moreover, in FIG. 4, in a state in which the upper mold 14 has been brought together with the lower mold 12, outlines of configuration elements of the upper molding sections 46, 48 that are disposed inside the lower cavity spaces 20, 22 are illustrated by double-dotted dashed lines.

The upper mold section 46 is configured including two cores 56, two cores 57, two cores 58, one core 60, a partitioning wall 70 provided at the core 60, and an upper cavity space 62. More specifically, the cores 56, 57 are provided projecting out from a flat face 64A of the upper mold 14 configuring part of an upper mold face portion 64, and the cores 58, 60 are provided inside the upper cavity space 62.

The two cores 56 configuring the upper mold section 46 are formed with their mold width direction inner sides having semicircular beveled column shapes in plan view. In a state in which upper mold 14 has been brought together with the lower mold 12, the cores 56 are set so as to have symmetry in the mold front-rear direction with respect to the partition 40 of the lower mold 12, and set so as to be disposed a predetermined distance away from the partition 40. Moreover, as illustrated in FIG. 1, ends 56A of the cores 56 are set with a mold vertical direction length so as to be disposed a predetermined distance away from the lower mold face portion 34 of the lower cavity space 20 in a state in which the upper mold 14 has been brought together with the lower mold 12.

Note that for the upper mold 14 as a whole, in a state in which the upper mold 14 has been brought together with the lower mold 12, upright faces 56B facing the mold width direction left side of the two cores 56 configuring the upper mold section 46 are set so as to abut an inner peripheral face of the peripheral walls 26. The upright faces 56B that facing the mold width direction left side of the two cores 56 configuring the upper mold section 48 are set so as to abut the side face of the lower partitioning wall 30, and configure part of the insertion portion 52.

The cores 57 are formed with quadrilateral column shapes and are respectively disposed a predetermined distance away from the cores 56 in the mold front-rear direction. More specifically, in a state in which the upper mold 14 has been brought together with the lower mold 12, upright faces 57B facing the mold width direction outside and upright faces 57C facing the mold front-rear direction outside of the cores 57 are disposed so as to abut respective inner peripheral faces of the peripheral walls 26.

Note that in a state in which the upper mold 14 has been brought together with the lower mold 12, the upright faces 57B facing the mold width direction left side of the cores 57 configuring the upper mold section 48 are set so as to abut a side face of the lower partitioning wall 30 and configure part of the insertion portion 52. Moreover, in a state in which the upper mold 14 has been brought together with the lower mold 12, ends 57A of the cores 57 are set with a mold vertical direction length so as to be disposed a predetermined distance away from the lower mold face portion 34 of the lower cavity space 20.

The upper cavity space 62 is formed at the mold width direction inside of the flat face 64A, and an upper face of the upper cavity space 62 is continuous with the flat face 64A and configures an inclined face 62A that is inclined from the mold width direction left side toward the mold width direction right side. Namely, the inclined face 62A configures part of the upper mold face portion 64. The cores 58, 60 are provided projecting out from the inclined face 62A of the upper cavity space 62. Note that in a state in which the upper mold 14 has been brought together with the lower mold 12, the upper mold face portion 64 opposes the lower mold face portion 34 of the lower cavity space 20.

The cores 58 are formed with quadrilateral column shapes, and are disposed a predetermined distance away from the respective cores 57 in the mold width direction. More specifically, in a state in which the upper mold 14 has been brought together with the lower mold 12, upright faces 58B that face the mold width direction right side of the cores 58 are disposed so as to respectively abut the lower side partitioning wall 30, and upright faces 58C that face the mold front-rear direction outside of the cores 58 are disposed so as to respectively abut the peripheral walls 26. Note that the upright faces 58B configure part of the insertion portion 52. Moreover, in the cores 58 configuring the upper mold section 48, the upright faces 58B that face the mold width direction outside thereof, and the upright faces 58C that face the mold front-rear direction outside thereof, are disposed so as to abut respective inner peripheral faces of the peripheral walls 26. In a state in which the upper mold 14 has been brought together with the lower mold 12, ends 58A of the cores 58 are set with a mold vertical direction length so as to be disposed a predetermined distance away from the lower mold face portion 34 of the lower cavity space 20.

The core 60 is formed in a cuboidal shape with its length direction in the mold front-rear direction. As illustrated in FIG. 1, in a state in which the upper mold 14 has been brought together with the lower mold 12, an end face 60A of the core 60 is set with a mold vertical direction length so as to be disposed a predetermined distance away from the lower mold face portion 34 of the lower cavity space 20. Moreover, the mold front-rear direction length of the core 60 is set such that both mold front-rear direction ends of the core 60 are disposed a predetermined distance away from the respective cores 58 in the mold front-rear direction.

An upright face 60B that faces the mold width direction inside of the core 60 is set so as to abut a side face of the lower side partitioning wall 30, and configures part of the insertion portion 52, in a state in which the upper mold 14 has been brought together with the lower mold 12. Note that the upright face 60B that faces the mold width direction right side of the core 60 configuring the upper mold section 48 is set so as to abut an inner peripheral face of the peripheral walls 26 in a state in which the upper mold 14 has been brought together with the lower mold 12. The partitioning wall 70 that is provided projecting out from the inclined face 62A of the upper mold face portion 64 is disposed integrated with the core 60 at a length direction central portion of the core 60.

The partitioning wall 70 extends along the mold width direction; is formed with a rectangular plate shape in side face view; and is disposed along a center line, of the partition 40, that runs in a direction parallel to the mold width direction in plan view, in a state in which the upper mold 14 has been brought together with the lower mold 12. The partitioning wall 70 is configured so as to divide the upper cavity space 62, and is set, together with the partition 40, so as to partition the lower cavity space 20 in a state in which the upper mold 14 has been brought together with the lower mold 12. In a state in which the upper mold 14 has been brought together with the lower mold 12, cavities 72 are thus formed by the partitioned upper cavity space 62 on one side and the one partitioned lower cavity space 20 on one side. Note that in the present exemplary embodiment, the upper mold 14 and the lower mold 12 are configured, for example, so as of the form four cavities 72 in a state in which the upper mold 14 has been brought together with the lower mold 12.

As illustrated in FIG. 1, the upper mold 14 and the lower mold 12 are configured such that the upper face 26A of the peripheral walls 26 of the lower mold 12 and an abutment face 14A of the upper mold 14 abut each other in a state in which the upper mold 14 has been brought together with the lower mold 12. However, the upper face 26A and the abutment face 14A adopt a state in which fine protrusions and recesses are irregularly formed therebetween (a roughened state), such that a tiny gap is formed between the upper face 26A and the abutment face 14A in a state in which the upper mold 14 has been brought together with the lower mold 12. Similarly, a tiny gap is also formed between the outer frame 28 of the lower mold 12 and an outer peripheral face 14B of the upper mold 14 that abuts the outer frame 28 in a state in which the upper mold 14 has been brought together with the lower mold 12. The upper peripheral edge 20A of the lower cavity space 20 and the outside of the mold 10 are thus placed communication with each other in a state in which the upper mold 14 has been brought together with the lower mold 12. Note that the cross-section of the lower mold 12 illustrated in FIG. 1 corresponds to a cross-section of the lower mold 12 taken along line A-A in FIG. 4.

Similarly, a tiny gap is also formed between the upper face 42A of the partition 42 and the upper mold 14, and between the lower side partitioning wall 30 and the insertion portion 52, in a state in which the upper mold 14 has been brought together with the lower mold 12. The upper peripheral edge 22A of the lower cavity space 22 and the outside of the mold 10 are thus placed in communication with each other in a state in which the upper mold 14 has been brought together with the lower mold 12.

The present exemplary embodiment is characterized by a parting line 76 configured by the upper mold face portion 64, the lower mold face portion 34, the partitioning wall 70, and the partition 40 in a state in which the upper mold 14 has been brought together with the lower mold 12. Detailed explanation follows regarding configuration of the parting line 76. Note that "parting line" here means the boundary between the upper mold 14 and the lower mold 12 in a state having been brought together, and a boundary between foam molded articles 78 described later. The "parting line" between the upper mold 14 and the lower mold 12 may be configured with the upper mold 14 and the lower mold 12 abutting each other, or may be configured in a state in which a gap is set between the upper mold 14 and the lower mold 12.

Figure 2A:
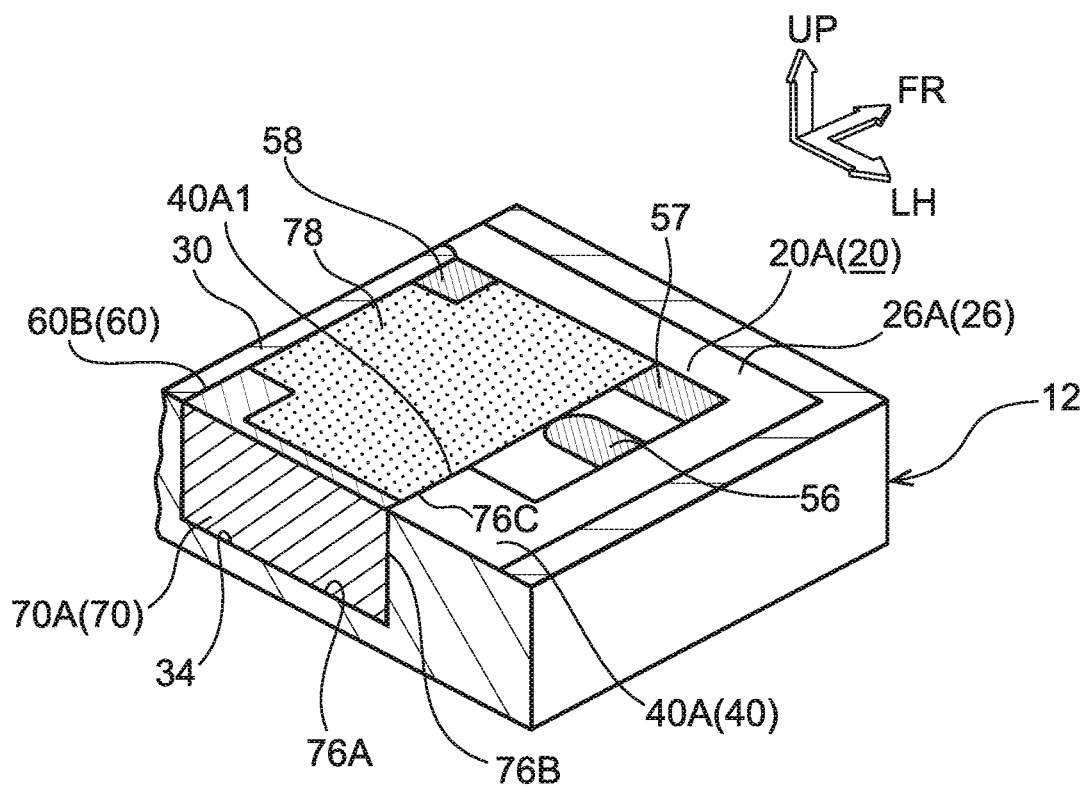
FIG. 2A is a perspective view illustrating a cross-section of a foam molded article mold sectioned along an upper face of a partition: a cross-section of a foam molded article mold sectioned along a center line that runs in a direction parallel to the partition in a mold width direction.

As illustrated in FIG. 1 and FIG. 2A, the parting line 76 is configured including a first parting line 76A, a second parting line 76B, and a third parting line 76C. The first parting line 76A is configured between a leading end 70A of the partitioning wall 70 and the lower mold face portion 34, and extends in a straight line shape along the mold width direction. The third parting line 76C is configured between the upper face 40A of the partition 40 and the upper mold face portion 64. Namely, the third parting line 76C includes part of the peripheral edge 40A1 of the upper face 40A, and is configured by a parting line extending in a straight line shape along the mold front-rear direction and a parting line extending in a straight line shape along the mold width direction.

The first parting line 76A and the third parting line 76C are in communication with each other due to the second parting line 76B being configured between the partitioning wall 70 and the partition 40. The second parting line 76B may be considered to be in communication with the outside of the cavities 72 through the third parting line 76C. Note that when viewing the parting line 76 overall, the position of the parting line 76 changes from the mold vertical direction lower side to the mold vertical direction upper side at the boundary configured by the second parting line 76B.

The parting line 76 configured as described above is capable of functioning as a flow path W for gas generated when molding foam molded articles. To explain further, a surface of the partitioning wall 70 and the lower mold face portion 34 that configure the first parting line 76A adopt a state in which fine protrusions and recesses are irregularly formed therebetween (a roughened state). Similarly, a surface of the partition 40 configuring the second parting line 76B, as well as the upper mold face portion 64 configuring the third parting line 76C, also adopt a state in which fine protrusions and recesses are irregularly formed therebetween (a roughened state). Accordingly, although configuration elements that configure the respective first parting line 76A, the second parting line 76B, and the third parting line 76C abut each other, a tiny gap is respectively configured therebetween. Namely, the parting line 76 is configured with a tiny gap that is continuous from the lower mold face portion 34 of the lower mold 12 to the upper peripheral edge 20A of the lower cavity space 20. Note that the first parting line 76A may be set with a gap that is 10 mm or less.

Here, the parting line 76 effectively functions as the gas flow path W, even were the second parting line 76B to be configured bent or curved. Namely, the partitioning wall 70 and the partition 40 may be configured such that the second parting line 76B is bent or curved. However, configuring the second parting line 76B with a straight line shape is thought to be preferable in order to establish good gas flow. In the present exemplary embodiment, the second parting line 76B is accordingly configured extending in a straight line shape along the mold vertical direction, for example.

As illustrated in FIG. 1 and FIG. 2, the lower cavity space 20 is provided at the lower mold 12 in the present exemplary embodiment. In a state in which the upper mold 14 has been brought together with the lower mold 12, the upper mold face portion 64 formed at the upper mold 14, which has been brought together with the lower mold 12, faces the lower mold face portion 34 of the lower mold 12. Moreover, the partitioning wall 70 is provided projecting out from the flat face 64A of the upper mold 14, and the partition 40 is provided projecting out from the lower mold face portion 34 of the lower mold 12.

The first parting line 76A is configured between the lower mold face portion 34 and the partitioning wall 70 in a state in which the upper mold 14 has been brought together with the lower mold 12. The lower cavity space 20 of the lower mold 12 is partitioned by the partitioning wall 70 and the partition 40 so as to form the plural cavities 72.

Figure 2B:
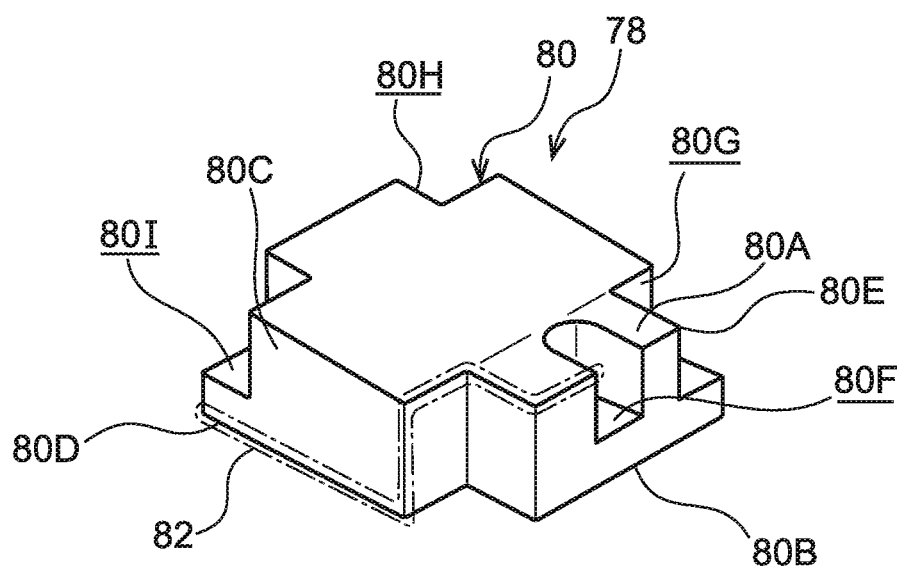
FIG. 2B is a perspective view illustrating a foam molded article according to the first exemplary embodiment.

The foam molded articles 78, as illustrated in FIG. 2B, are accordingly formed in the plural cavities 72 by injecting a foaming liquid resin stock into the lower cavity space 20 of the lower mold 12 and bringing the upper mold 14 together with the lower mold 12.

To explain further, for example, first, a formulation composed of a mix of a polyisocyanate component, a polyol component, a foaming agent, a catalyst, a foam stabilizer, and other additives is mixed in a mixing head (not illustrated in the drawings) to obtain the foaming liquid resin stock. Then, the foaming liquid resin stock is injected into the lower cavity spaces 20, 22 of the lower mold 12 and the upper mold 14 is brought together with the lower mold 12. Accordingly, as the foaming liquid resin stock foams and expands across the upper mold face portion 64 of the upper mold 14 and the lower mold face portion 34 of the lower mold 12, the foaming liquid resin stock proceeds to harden within the plural cavities 72. As a result, plural foam molded articles 78 can be formed by a single round of injection of foaming liquid resin stock.

Note that in cases in which the lower cavity space 20 of the lower mold 12 were to be partitioned only by the partitioning wall 70, the parting line 76 between the partitioning wall 70 of the upper mold 14 and the lower mold face portion 34 of the lower mold 12 would be configured along the lower mold face portion 34 of the lower mold 12. The gas generated when the foaming liquid resin stock is foamed would thus have nowhere to escape, and it is conceivable that underfilling of the foam molded articles 78 would occur.

However, in the present exemplary embodiment, the second parting line 76B is configured between the partitioning wall 70 of the upper mold 14 and the partition 40 that is provided projecting out from the lower mold face portion 34 of the lower mold 12 in a state in which the upper mold 14 has been brought together with the lower mold 12. The first parting line 76A and the outside of the cavities 72 are in communication with each other due to the second parting line 76B. The inside of the cavities 72, which are formed partitioned by the partitioning wall 70 and the partition 40 into the lower cavity spaces 20, 22, and the outside of the cavities 72, are thereby placed in a state of communication with each other. As a result, gas that is generated when the foaming liquid resin stock is foamed is released from the inside of the cavities 72 to the outside of the cavities 72. In other words, the gas flow path W is configured including the first parting line 76A and the second parting line 76B.

In the present exemplary embodiment, the second parting line 76B is in communication with the outside of the cavities 72 through the third parting line 76C configured between the upper mold face portion 64 and the partition 40 in a state in which the upper mold 14 has been brought together with the lower mold 12. Thus, when molding the foam molded articles 78, even if gas were to rise to as far as the surroundings of an upper mold face portion 64 side end of the partitioning wall 70, gas does not remain at the surroundings at this end, but rather is released from the inside of the cavities 72 to the outside of the cavities 72. As a result, underfilling at upper portions of the foam molded articles 78 can be suppressed from occurring.

In the present exemplary embodiment, the upper face (upper end) 40A of the partition 40 is formed in communication with the upper peripheral edge 20A of the lower cavity space 20 of the lower mold 12. The second parting line 76B is thus open at the upper face 40A of the partition 40 to the outside of the cavities 72. When molding the foam molded articles 78, gas that rises along the partitioning wall 70 of the upper mold 14 can thereby be efficiently released to the outside of the cavities 72.

In addition, in the present exemplary embodiment, the partition 40 is formed on the lower mold 12 side. Thus, when the upper mold 14 is brought away from the lower mold 12 after the foaming liquid resin stock hardens, the foam molded article 78 stays more readily on the lower mold 12 side. Operation to retrieve the foam molded articles 78 can thus be made more efficient.

As illustrated in FIG. 2B, a main body 80 of a foam molded article 78 that was formed in the mold 10 is formed including an upper face 80A, a lower face 80B, and an outer peripheral face 80C that connects the upper face 80A and the lower face 80B together. A parting line 82 portion (a portion enclosed by the dotted line) is formed at the outer peripheral face 80C.

The parting line 82 portion is formed from one end 80D side of the main body 80 at the lower face 80B to another end 80E side of the main body 80 on the opposite side to the one end side 80D at the upper face 80A. More specifically, the shape of the parting line 82 portion is set so as not to transit the other end 80E side of the lower face 80B in side view. Note that the foam molded article 78 is formed with a recess 80F corresponding to the shape of the core 56, a recess 80G corresponding to the shape of the core 57, a recess 80H corresponding to the shape of the core 58, and a recess 80I corresponding to the shape of the core 60.

Thus, the present exemplary embodiment enables a foam molded article mold 10 capable of suppressing underfilling from occurring while securing productivity, and a foam molded article 78 in which underfill has been reduced, to be obtained.

Second Exemplary Embodiment

Figure 6A:
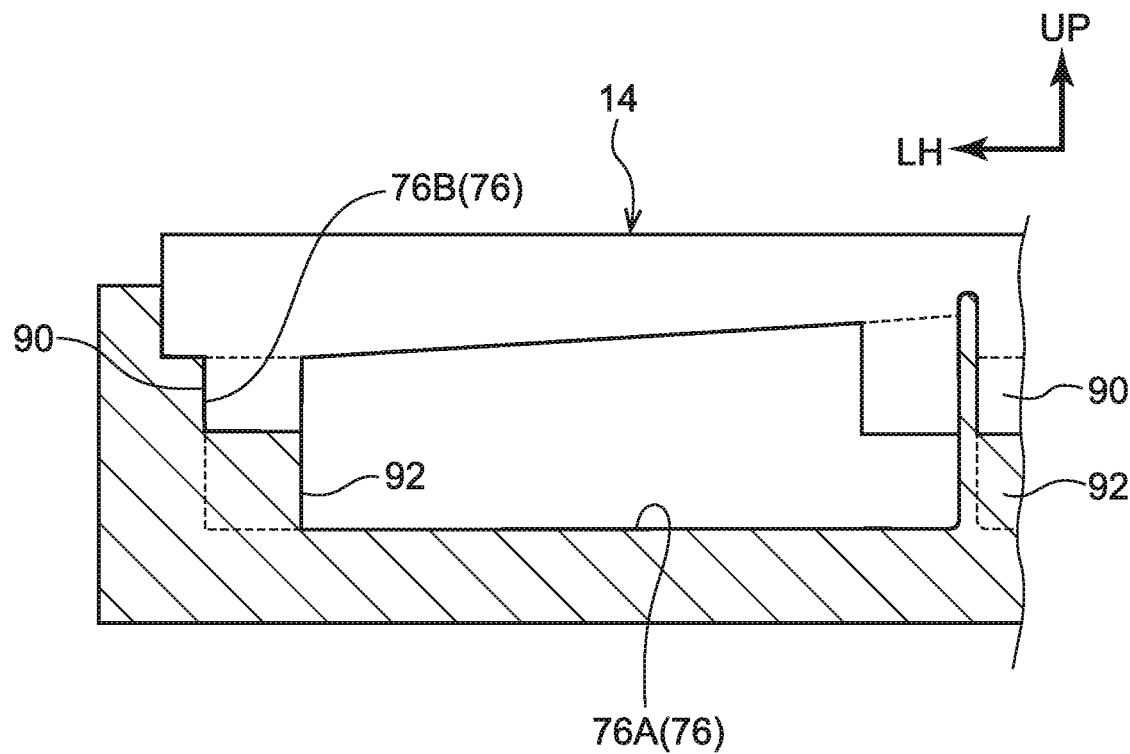
FIG. 6A is a cross-section illustrating configuration of a foam molded article mold according to a second exemplary embodiment.

Next, explanation follows regarding a second exemplary embodiment of the mold 10 and the foam molded article 78 according to the present disclosure, with reference to FIG. 6. Note that configuration components similar to those in the first exemplary embodiment described above are appended with the same reference numerals, and explanation thereof is omitted. Although the partition 40 was only provided at the lower mold 12 in the first exemplary embodiment, as illustrated in FIG. 6A, the partition 40 may be provided divided between the upper mold 14 and the lower mold 12. For example, configuration may be made in which the partition 40 is split at a mold vertical direction central portion of the partition 40 such that an upper partition 90 is integrally formed at the partitioning wall 70 of the upper mold 14, and a lower partition 92 is formed at the lower mold 12.

In the mold 10 configured in this manner, the first parting line 76A and the outside of the cavities 72 can be placed in communication with each other by the second parting line 76B despite the second parting line 76B being configured bent. In a state in which the inside of the cavities 72 and the outside of the cavities 72 are in communication with each other, gas generated when the foam molded article 78 is foamed can thereby be released to the outside of the cavities 72. Moreover, in the present exemplary embodiment, part of the second parting line 76B can be set to a mold vertical direction central portion of the cavities 72 in a state in which the upper mold 14 has been brought together with the lower mold 12.

Note that in the present exemplary embodiment, the third parting line 76C may be set, for example, by the upper partition 90 having a triangular shape as viewed along the mold front-rear direction, and the lower partition 92 of trapezoidal shape having an upper base on the cavity 72 side as viewed along the mold front-rear direction. By configuring the mold 10 in such a manner, even more gas can be released to the outside of the cavities 72, and as a result, underfilling in the foam molded article 78 can be effectively suppressed from occurring.

Figure 6B:
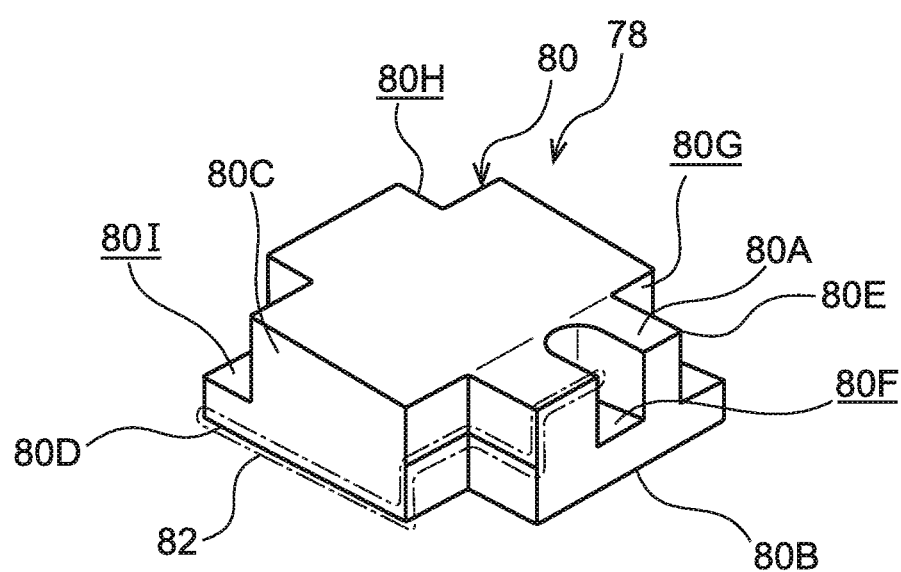
FIG. 6B is a perspective view illustrating a foam molded article according to the second exemplary embodiment.

As illustrated in FIG. 6B, the parting line 82 of the foam molded article 78 formed in the mold 10 is formed including a portion extending from the one end side 80D side of the main body 80 between the upper face 80A and the lower face 80B to the other end 80E side of the main body 80.

Third Exemplary Embodiment

Figure 7A:
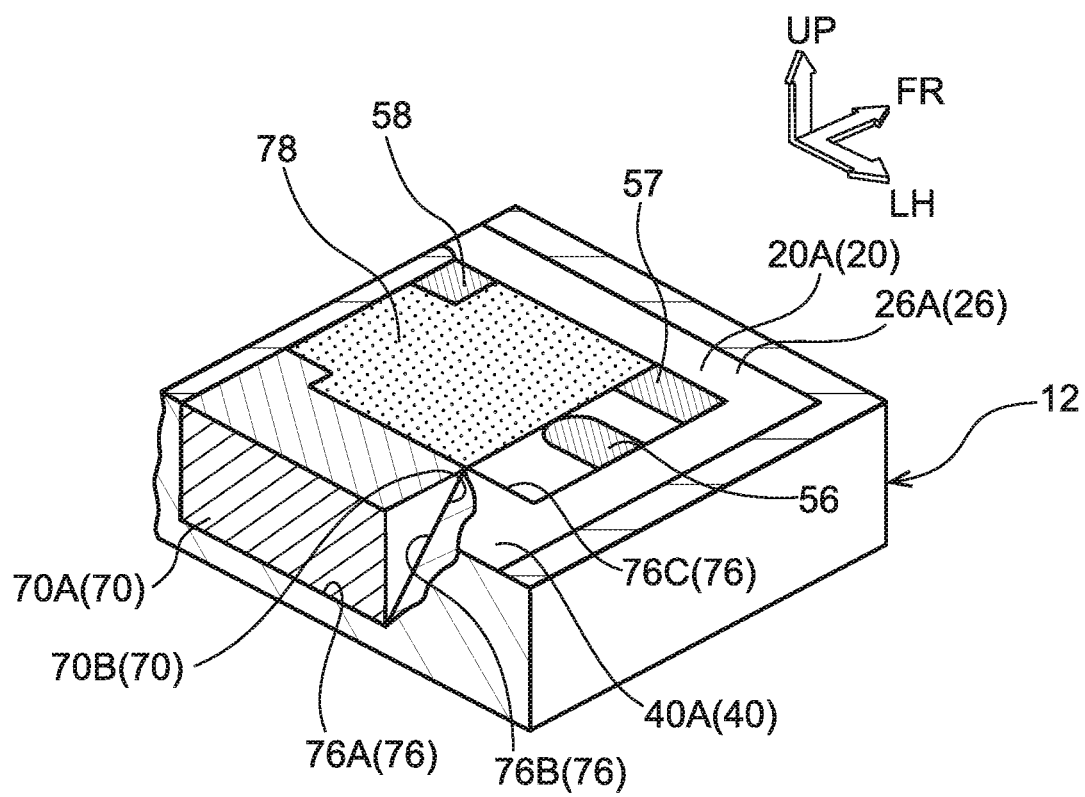
FIG. 7A is a perspective view of a cross-section illustrating a relationship between a foam molded article mold and a foam molded article according to a third exemplary embodiment.

Next, explanation follows regarding a third exemplary embodiment of the mold 10 and the foam molded article 78 according to the present disclosure, with reference to FIG. 7. Note that configuration components similar to those in the first exemplary embodiment described above are appended with the same reference numerals, and explanation thereof is omitted. Although the partitioning wall 70 was formed in a plate shape in the first exemplary embodiment, as illustrated in FIG. 7A, the partitioning wall 70 may be formed with a triangular block shape as viewed in vertical cross-section.

In a mold 10 configured in such a manner, the angle formed between a mold face 70B of the partitioning wall 70 and the upper mold face portion 64 of the upper mold 14 is an obtuse angle. Accordingly, gas generated when foaming the foaming liquid resin stock can be suppressed from lingering at the surroundings of the upper mold face portion 64 side end of the partitioning wall 70.

Figure 7B:
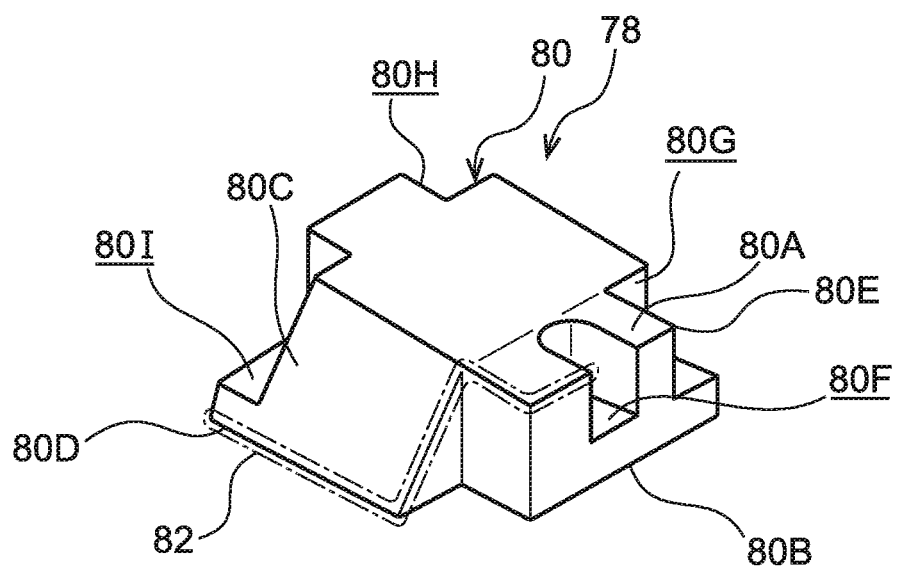
FIG. 7B is a perspective view illustrating a foam molded article according to the third exemplary embodiment.

As illustrated in FIG. 7B, the outer peripheral face 80C of the foam molded article 78 formed in the mold 10 is configured including an inclined face 80C1 that is formed by the mold face 70B of the partitioning wall 70. Part of the parting line 82 portion is formed running along a peripheral edge of the inclined face 80C1.

Note that the present exemplary embodiment described above is configured such that four cavities 72 are formed in a state in which the upper mold 14 has been brought together with the lower mold 12; however, the number of cavities 72 may be modified as appropriate within a range in which molding of the foam molded articles 78 is not hindered. The shape and the number of the cores 56, 57, 58, and 60 are not limited to the above, and various configurations thereof are possible.

Configuration of the partition 40 and the partitioning wall 70 is not limited to the above, and the partition 40 may have a rectangular plate shape in side face view, or the partition 40 and the partitioning wall 70 may each be formed with trapezoidal plate shapes in side face view. In a mold 10 configured in this manner, the third parting line 76C is configured only by the parting line extending in a straight line shape in the mold width direction.

The partition 40 may be formed with a triangular plate shape in side face view, and the partitioning wall 70 may be formed with a trapezoidal plate shape in side face view. In a mold 10 configured in this manner, the parting line 76 is configured by the first parting line 76A and the second parting line 76B, and the overall length of the parting line 76 can be set shorter.

Moreover, in the exemplary embodiment described above, the parting line 76 is configured by plural straight line shaped parting lines; however, the parting line 76 may be configured by curved or bent parting lines.

The entire content of the disclosure of Japanese Patent Application No. 2014-138050 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A foam molded article comprising: a main body that is formed from foamed resin that is molded using a mold comprising an upper mold and lower mold and that includes an upper face, a lower face, an outer periphery connecting the upper face and the lower face together, the outer periphery including a first side face, a second side face, and a third side face, the first side face being adjacent the second side face, and the third side face being opposite the first side face, a first edge defined by the lower face intersecting the first side face, a second edge defined by the lower face intersecting the second side face, a third edge defined by the upper face intersecting the third side face, a fourth edge defined by the lower face intersecting the third side face; and a parting line that is formed by the upper mold that has been brought together with the lower mold and is configured as a ridge that is provided at the outer periphery and that extends from a first point on the first edge, along the second edge, and also extending along the third edge, without transiting the fourth edge.

* * * * *